United States Patent
Yao (10) Patent No.: US 7,584,097 B2
(45) Date of Patent: Sep. 1, 2009

(54) SYSTEM AND METHOD FOR NOISY AUTOMATIC SPEECH RECOGNITION EMPLOYING JOINT COMPENSATION OF ADDITIVE AND CONVOLUTIVE DISTORTIONS

(75) Inventor: Kaisheng N. Yao, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 650 days.

(21) Appl. No.: 11/298,332

(22) Filed: Dec. 9, 2005

(65) Prior Publication Data
US 2007/0033028 A1 Feb. 8, 2007

Related U.S. Application Data

(63) Continuation-in-part of application No. 11/195,895, filed on Aug. 3, 2005, now abandoned.

(51) Int. Cl.
*G10L 15/20* (2006.01)
(52) U.S. Cl. .................. 704/233; 704/231; 704/226
(58) Field of Classification Search ............... 704/226, 704/231, 233
See application file for complete search history.

(56) References Cited

U.S. PATENT DOCUMENTS 6,691,091 B1 * 2/2004 Cerisara et al. ............. 704/255

2003/0033143 A1 * 2/2003 Aronowitz ............. 704/233
2003/0115055 A1 * 6/2003 Gong .................. 704/233

OTHER PUBLICATIONS

Yuxin Zhao, Frequency-Domain Maximum Likelihood Estimation for Automatic Speech Recognition in Additive and Convolutive Noises, May 2003, IEEE, vol. 8, pp. 255-266.*

* cited by examiner

*Primary Examiner*—Vijay B Chawan
(74) *Attorney, Agent, or Firm*—Mima G. Abyad; Wade J. Brady, III; Frederick J. Telecky, Jr.

(57) ABSTRACT

A system for, and method of, noisy automatic speech recognition employing joint compensation of additive and convolutive distortions and a digital signal processor incorporating the system or the method. In one embodiment, the system includes: (1) an additive distortion factor estimator configured to estimate an additive distortion factor, (2) an acoustic model compensator coupled to the additive distortion factor estimator and configured to use estimates of a convolutive distortion factor and the additive distortion factor to compensate acoustic models and recognize a current utterance, (3) an utterance aligner coupled to the acoustic model compensator and configured to align the current utterance using recognition output and (4) a convolutive distortion factor estimator coupled to the utterance aligner and configured to estimate an updated convolutive distortion factor based on the current utterance using differential terms but disregarding log-spectral domain variance terms.

20 Claims, 6 Drawing Sheets

*FIG. 8*
WER (% IN $LOG_{10}$ SCALE) IN PARKED CONDITION

*FIG. 9*

WER (% IN LOG$_{10}$ SCALE) IN CITY-DRIVING CONDITION

SYSTEM AND METHOD FOR NOISY AUTOMATIC SPEECH RECOGNITION EMPLOYING JOINT COMPENSATION OF ADDITIVE AND CONVOLUTIVE DISTORTIONS

CROSS-REFERENCE TO RELATED APPLICATIONS

The present invention is a continuation-in-part of, and claims priority based on, U.S. patent application Ser. No. 11/195,895 by Yao, entitled "System and Method for Noisy Automatic Speech Recognition Employing Joint Compensation of Additive and Convolutive Distortions," filed Aug. 3, 2005 now abandoned and is further related to U.S. patent application Ser. No. 11/196,601 by Yao, entitled "System and Method for Creating Generalized Tied-Mixture Hidden Markov Models for Automatic Speech Recognition," filed Aug. 3, 2005, commonly assigned with the present invention and incorporated herein by reference.

TECHNICAL FIELD OF THE INVENTION

The present invention is directed, in general, to speech recognition and, more specifically, to a system and method for noisy automatic speech recognition (ASR) employing joint compensation of additive and convolutive distortions.

BACKGROUND OF THE INVENTION

Over the last few decades, the focus in ASR has gradually shifted from laboratory experiments performed on carefully enunciated speech received by high-fidelity equipment in quiet environments to real applications having to cope with normal speech received by low-cost equipment in noisy environments.

In the latter case, an ASR system has to be robust to at least two sources of distortion. One is additive in nature—background noise, such as a computer fan, a car engine or road noise. The other is convolutive in nature—changes in microphone type (e.g., a hand-held microphone or a hands-free microphone) or position relative to the speaker's mouth. In mobile applications of speech recognition, both background noise and microphone type and relative position are subject to change. Therefore, it is critical that ASR systems be able to compensate for the two distortions jointly.

Various approaches have been taken to address this problem. One approach involves pursuing features that are inherently robust to distortions. Techniques using this approach include relative spectral technique-perceptual linear prediction, or RASTA-PLP, analysis (see, e.g., Hermansky, et al., "Rasta-PLP Speech Analysis Technique," in ICASSP, 1992, pp. 121-124) and cepstral normalization such as cepstrum mean normalization, or CMN, analysis (see, e.g., Rahim, et al., "Signal Bias Removal by Maximum Likelihood Estimation for Robust Telephone Speech Recognition," IEEE Trans. on Speech and Audio Processing, vol. 4, no. 1, pp. 19-30, January 1996) and histogram normalization (see, e.g., Hilger, et al., "Quantile Based Histogram Equalization for Noise Robust Speech Recognition," in EUROSPEECH, 2001, pp. 1135-1138). The second approach is called "feature compensation," and works to reduce distortions of features caused by environmental interference.

Spectral subtraction (see, e.g., Boll, "Suppression of Acoustic Noise in Speech Using Spectral Subtraction," IEEE Trans. on ASSP, vol. 27, pp. 113-120, 1979) is widely used to mitigate additive noise. More recently, the European Telecommunications Standards Institute (ETSI) proposed an advanced front-end (see, e.g., Macho, et al., "Evaluation of a Noise-Robust DSR Front-End on Aurora Databases" in ICSLP, 2002, pp. 17-20) that combines Wiener filtering with CMN.

Using stereo data for training and testing, compensation vectors may be estimated via code-dependent cepstral normalization, or CDCN, analysis (see, e.g., Acero, et al., "Environment Robustness in Automatic Speech Recognition" in ICASSP 1990, 849-852) and SPLICE (see, e.g., Deng, et al., "High-Performance Robust Speech Recognition Using Stereo Training Data," in ICASSP, 2001, pp. 301-304). Unfortunately, stereo data is unheard-of in mobile applications.

Another approach involves vector Taylor series, or VTS, analysis (see, e.g., Moreno, et al., "A Vector Taylor Series Approach for Environment-Independent Speech Recognition," in ICASSP, 1996, vol. 2, pp. 733-736), which uses a model of environmental effects to recover unobserved clean speech features.

The third approach is called "model compensation." Probably the most well-known model compensation techniques are multi-condition training and single-pass retraining. Unfortunately, these techniques require a large database to cover a variety of environments, which renders them unsuitable for mobile or other applications where computing resources are limited.

Other model compensation techniques make use of maximum likelihood linear regression (MLLR) (see, e.g., Woodland, et al., "Improving Environmental Robustness in Large Vocabulary Speech Recognition," in ICASSP, 1996, pp. 65-68, and Sankar, et al., "A Maximum-Likelihood Approach to Stochastic Matching for Robust Speech Recognition," IEEE Trans. on Speech and Audio Processing, vol. 4, no. 3, pp. 190-201, 1996) or maximum a posteriori probability estimation (see, e.g., Chou, et al. "Maximum A Posterior Linear Regression based Variance Adaptation on Continuous Density HMMs" technical report ALR-2002-045, Avaya Labs Research, 2002) to estimate transformation matrices from a smaller set of adaptation data. However, such estimation still requires a relatively large amount of adaptation data, which may not be available in mobile applications.

Using an explicit model of environment effects, the method of parallel model combination, or PMC (see, e.g., Gales, et al., "Robust Continuous Speech Recognition using Parallel Model Combination" in IEEE Trans. On Speech and Audio Processing, vol. 4, no. 5, 1996, pp. 352-359) and its extensions, such as sequential compensation (see, e.g., Yao, et al., "Noise Adaptive Speech Recognition Based on Sequential Noise Parameter Estimation," Speech Communication, vol. 42, no. 1, pp. 5-23, 2004) may adapt model parameters with fewer frames of noisy speech. However, for mobile applications with limited computing resources, direct use of model compensation methods such as Gales, et al., and Yao, et al., both supra, almost always prove impractical.

What is needed in the art is a superior system and method for model compensation that functions well in a variety of background noise and microphone environments, particularly noisy environments, and is suitable for applications where computing resources are limited, e.g., digital signal processors (DSPs), especially those in mobile applications.

SUMMARY OF THE INVENTION

To address the above-discussed deficiencies of the prior art, the present invention provides systems and methods for providing ASR in noisy or low-noise environments by a process of joint additive and convolutive distortion adaptation in which estimates of distortion factors are related to HMM parameters. In one embodiment, the system includes: (1) an additive distortion factor estimator configured to estimate an additive distortion factor, (2) an acoustic model compensator coupled to the additive distortion factor estimator and configured to use estimates of a convolutive distortion factor and the additive distortion factor to compensate acoustic models and recognize a current utterance, (3) an utterance aligner coupled to the acoustic model compensator and configured to align the current utterance using recognition output and (4) a convolutive distortion factor estimator coupled to the utterance aligner and configured to estimate an updated convolutive distortion factor based on the current utterance using differential terms but disregarding log-spectral domain variance terms.

In one embodiment, the method includes: (1) estimating an additive distortion factor, (2) using estimates of a convolutive distortion factor and the additive distortion factor to compensate acoustic models and recognize a current utterance, (3) aligning the current utterance using recognition output and (4) estimating an updated convolutive distortion factor based on the current utterance using differential terms but disregarding log-spectral domain variance terms.

In yet another aspect, the present invention provides a DSP. In one embodiment, the DSP includes data processing and storage circuitry controlled by a sequence of executable instructions configured to: (1) estimate an additive distortion factor, (2) use estimates of a convolutive distortion factor and the additive distortion factor to compensate acoustic models and recognize a current utterance, (3) align the current utterance using recognition output and (4) estimate an updated convolutive distortion factor based on the current utterance using differential terms but disregarding log-spectral domain variance terms.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

The present invention introduces a novel system and method for model compensation that functions well in a variety of background noise and microphone environments, particularly noisy environments, and is suitable for applications where computing resources are limited, e.g., mobile applications.

Using a model of environmental effects on clean speech features, an embodiment of the present invention to be illustrated and described updates estimates of distortion by a segmental Expectation-Maximization (E-M)-type algorithm, given a clean speech model and noisy observation. Estimated distortion factors are related inherently to clean speech model parameters, which results in overall better performance than PMC-like techniques, in which distortion factors are instead estimated directly from noisy speech without using a clean speech model.

Alternative embodiments employ simplification techniques in consideration of the limited computing resources found in mobile applications, such as wireless telecommunications devices. To accommodate possible modeling error brought about by use of simplification techniques, a discounting factor is introduced into the estimation process of distortion factors.

First, the theoretical underpinnings of an exemplary technique falling within the scope of the present invention will be set forth. Then, an exemplary system and method for noisy ASR employing joint compensation of additive and convolutive distortions will be described. Then, results from experimental trials of one embodiment of a technique carried out according to the teachings of the present invention will be set forth in an effort to demonstrate the potential efficacy of the new technique. The results will show that the new technique is able to attain robust performances in a variety of conditions, achieving significant performance improvement as compared to a baseline technique that has no noise compensation and a conventional compensation technique.

Accordingly, a discussion of the theoretical underpinnings of the exemplary technique will being by first establishing the relationship between distorted speech, additive and convolutive distortion factors.

A speech signal x(t) may be observed in noisy environments that contains background noise n(t) and a distortion channel h(t). For typical mobile applications, n(t) typically arises from office noise, vehicle engine and road noise. h(t) typically arises from the make and model of the mobile telecommunication device used and the relative position of the person speaking to the microphone in the mobile telecommunication device. These environmental effects are assumed to cause linear distortions on the clean signal x(t).

If y(t) denotes the observed noisy speech signal, the following Equation (1) results:

$$y(t) = x(t) * h(t) + n(t) \tag{1}$$

Short-time fast Fourier transform (SFFT) is then applied to the noisy signal, transforming it to a linear frequency domain. In the linear frequency domain, the convolution operation * in Equation (1) becomes production, hence the signals in the linear frequency domain have the following relationship:

$$Y^{lin}(k) = X^{lin}(k) H^{lin}(k) + N^{lin}(k), \tag{2}$$

where the superscript $^{lin}$ denotes the linear spectral domain and k denotes a frequency index. Power spectral components may further be extracted via Mel-frequency warping, square of the frequency magnitude and triangular binning (see, e.g., Rabiner, *A Tutorial on Hidden Markov Models and Selected Applications in Speech Recognition*, in proceedings of the IEEE, 77(2), 1989, pp. 257-286).

The cepstral feature may be derived by taking a conventional discrete cosine transform (DCT) of the log-compressed power spectral components and transforming the components to a log-spectral domain. In the log-spectral domain, due to the non-linear log-compression, the above linear function becomes non-linear:

$$Y^l(k) = g(X^l(k), H^l(k), N^l(k)) \tag{3}$$

where:

$$g(X^l(k), H^l(k), N^l(k)) = \log(\exp(X^l(k) + H^l(k)) + \exp(N^l(k))), \tag{4}$$

and the superscript $^l$ denotes the log-spectral domain. (see, e.g., Gales, et al., "Robust Continuous Speech Recognition using Parallel Model Combination" in IEEE Trans. On Speech and Audio Processing, vol. 4, no. 5, 1996, pp. 352-359)

Assuming the log-normal distribution and ignoring variance of the above terms, the following Equation (5) results:

$$E\{Y^l(k)\} = \hat{\mu}^l = g(\mu^l, H^l, N^l), \tag{5}$$

where $\mu^l$ is the clean speech mean vector and $\hat{\mu}^l$ is the compensated mean vector.

The overall objective is to derive a segmental technique for estimating distortion factors. $H^l$ and $N^l$ denote, respectively, the mean vector of H(k) and $N^l(k)$. It is assumed that continuous-density hidden Markov models (CD-HMMs) $\Lambda_X$ for $X^l(k)$ are trained on clean Mel frequency cepstral coefficient, or MFCC, feature vectors and represented as:

$$\Lambda_X = \{\{\pi_q, \alpha_{qq}, c_{qp}, \mu_{qp}^c, \Sigma_{qp}^c\} : q, q' = 1 \ldots S, p = 1 \ldots M, \mu_{qp}^c = \{\mu_{qpd}^c : d = 1 \ldots D\}, \Sigma_{qp}^c = \{\sigma_{qpd}^c : d = 1 \ldots D\}\}$$

where $\pi_q$ is the initial state distribution for state q, $\alpha_{qq'}$ is the state transition probability, $c_{qp}$ is the mixture weight for the state q and $p^{th}$ multivariate Gaussian density, $\mu_{qp}^c$ is the mean vector of the $p^{th}$ multivariate Gaussian density for the state q, $\Sigma_{qp}^c$ is the (presumed diagonal) covariance matrix of the $p^{th}$ multivariate Gaussian density for the state q, S is the number of states, M is the number of multivariate Gaussian densities for each state, D is the dimension of the feature vectors and thus also of each multivariate Gaussian density. (Ordinarily, c would be superscripted to denote the cepstral domain; however, for simplicity of expression, feature vectors will be assumed to be in the cepstral domain and the superscript omitted.)

Distortion factors are estimated via the conventional maximum-likelihood principle. A conventional E-M algorithm (see, e.g., Rabiner, supra) is applied for the maximum-likelihood estimation, because $\Lambda_X$ contains an unseen state sequence.

R is defined to be the number of utterances available for estimating distortion factors. $K_r$ is defined to be the number of frames in an utterance r. m denotes a Gaussian component in a state s. Using the E-M algorithm, an auxiliary function is constructed as follows:

$$Q^{(R)}(\lambda | \bar{\lambda}) = \sum_{r=1}^{R} \sum_{k=1}^{K_r} \sum_{s_k=1}^{S} \sum_{m_k=1}^{M} p(s_k = q, m_k = p | Y_r(1:K_r), \bar{\lambda}) \tag{6}$$

$$\log p(Y_r(k) | s_k = q, m_k = p, \lambda)$$

where $\lambda = (H^l, N^l)$ and $\bar{\lambda} = (\bar{H}^l, \bar{N}^l)$ respectively denote the to-be-estimated distortion factors and estimated distortion factors. $Y_r(1:K_r)$ is the sequence of feature vectors for the $K_r$ frames of utterance r, and $Y_r(k)$ is the feature vector for frame k of utterance r.

It will be assumed that environmental effects do not distort the variance of a Gaussian density. Thus the form for $p(Y_r(k) | s_k=q, m_k=p, \lambda)$ is:

$$p(Y_r(k) | s_k=q, m_k=p, \lambda) = b_{qp}(Y_r(k)) \sim N(Y_r(k); \hat{\mu}_{qp}, \sigma_{qp}^2). \tag{7}$$

The posterior probability $p(s_k=q, m_k=p | Y_r(1:K_r), \bar{\lambda})$ is usually denoted as $\gamma_{qp}^r(k)$, which is also called the "sufficient statistic" of the E-M algorithm.

In the illustrated embodiment, the sufficient statistics are obtained through the well-known forward-backward algorithm (e.g., Rabiner, supra). In the forward step of the forward-backward algorithm, the forward variable $\alpha_q(k)$ is defined as $p(Y_r(1:k), s_k=q | \bar{\lambda})$. The forward variable $\alpha_q(k)$ is inductively obtained as follows:

$$\alpha_q(k+1) = \left[\sum_i \alpha_i(k) a_{iq}\right] b_q(Y_r(k+1) | \bar{\lambda}), \tag{8}$$

where $a_{iq}$ is the state transition probability from i to q and:

$$b_q(Y_r(k+1) | \bar{\lambda}) = \sum_m c_{qm} N(Y_r(k+1) | \bar{\mu}_{qm}, \sigma_{qm}^2) \tag{9}$$

where $c_{qm}$ is the mixture weight of Gaussian component m at state q. Note that $\bar{\mu}_{qm}$ is obtained via Equation (5) by substituting $H^l$ and $N^l$ with corresponding parameters in $\bar{\lambda}$. The backward step in the forward-backward algorithm can also be found in Rabiner, supra.

Sufficient statistics are vital to the performance of the E-M and similar-type algorithms. State sequence segmentation will be assumed to be available, allowing what is usually called "supervised estimation." However, recognition results can provide the segmentation in practical applications, which is usually called "unsupervised estimation."

Maximizing Equation (6) with respect to the convolutive distortion factor involves iterative estimation to find the value of $H^l$ which makes the derivation of Q with respect to $H^l$ vanish. The well-known Newton-Raphson method may be used to update the convolutive distortion estimate due to its rapid convergence rate. The new estimate of the convolutive distortion factor is given as:

$$H^l = \overline{H}^l - \frac{\Delta_{H^l} Q^{(R)}(\lambda|\overline{\lambda})}{\Delta^2_{H^l} Q^{(R)}(\lambda|\overline{\lambda})}\bigg|_{H^l = \overline{H}^l}. \quad (10)$$

Note that each component of the vector $H^l$ is separately treated with its own auxiliary function $Q^{(R)}(\lambda|\overline{\lambda})$ and derivatives and recursion.

Using the chain rule of differentiation, $\Delta_{H^l}Q(\lambda|\overline{\lambda})$, the first-order differentiation of the auxiliary function (6) with respect to $H^l$ is given as:

$$\Delta_{H^l} Q^{(R)}(\lambda|\overline{\lambda}) = \quad (11)$$
$$-\sum_{r=1}^{R}\sum_{k=1}^{K_r}\sum_{q=1}^{S}\sum_{p=1}^{M}\gamma^r_{qp}(k)\frac{1}{\sigma^{2l}_{qp}}[g(\mu^l_{qp}, H^l, N^l) - C^{-1}Y_r(k)]$$
$$\Delta_{H^l}g(\mu^l_{qp}, H^l, N^l),$$

where $C^{-1}$ denotes an inverse discrete cosine transformation. $\sigma_{qp}^{2l}$ is the variance vector in log-spectral domain. Equation (13) gives the first-order differential term $\Delta_{H^l}g(\mu_{qp}{}^l,H^l,N^l)$.

The second order differentiation of Equation (6) with respect to the convolutive distortion factor $H^l$ is given as:

$$\Delta^2_{H^l} Q^{(R)}(\lambda|\overline{\lambda}) = \quad (12)$$
$$-\sum_{r=1}^{R}\sum_{k=1}^{K_r}\sum_{q=1}^{S}\sum_{p=1}^{M}\gamma^r_{qp}(k)\frac{1}{\sigma^{2l}_{qp}}\Big[(\Delta_{H^l}g(\mu^l_{qp}, H^l, N^l))^2 +$$
$$(g(\mu^l_{qp}, H^l, N^l) - C^{-1}Y_r(k))\Delta^2_{H^l}g(\mu^l_{qp}, H^l, N^l)\Big],$$

where the second-order term $\Delta_{H^l}^2 g(\mu_{qp}{}^l,H^l,N^l)$ is given in Equation (14).

Straightforward algebraic manipulation of Equation (5) results in the first- and second-order differentials of $g(\mu_{qp}{}^l, H^l, N^l)$:

$$\Delta_{H^l}g(\mu^l_{qp}, H^l, N^l) = \frac{\exp(H^l + \mu^l_{qp})}{\exp(H^l + \mu^l_{qp}) + \exp(N^l)}, \quad (13)$$

$$\Delta^2_{H^l}g(\mu^l_{qp}, H^l, N^l) = \Delta_{H^l}g(\mu^l_{qp}, H^l, N^l)(1 - \Delta_{H^l}g(\mu^l_{qp}, H^l, N^l)). \quad (14)$$

With the same approach described above, the updating formula for the additive distortion factor may be obtained as:

$$N^l = \overline{N}^l - \frac{\Delta_{N^l} Q^{(R)}(\lambda|\overline{\lambda})}{\Delta^2_{N^l} Q^{(R)}(\lambda|\overline{\lambda})}\bigg|_{N^l = \overline{N}^l}, \quad (15)$$

where the first- and second-order differentials in the equation are given in Equation (24) and (25), respectively. As with $H^l$, each component of $N^l$ is treated separately.

Although $H^l$ and $N^l$ can be estimated in the above similar way, their usages are entirely different. The convolutive distortion is slowly varying; its estimate may be used for the following utterance. In contrast, the additive distortion has been found to be highly variable in mobile environments. Unless second-pass estimation is allowed, an estimate by Equation (15) may not help performance.

Since the present invention may find advantageous use in applications having limited computing resources, updating formulae in Equation (11) and (12) may be further simplified. Those skilled in the pertinent art will observe that the variance term in log-spectral domain is costly to obtain due to heavy transformations between the cepstral and log-spectral domains. Therefore, a simplified solution is in order.

Ignoring the variance term, results in the following Equations (16) and (17):

$$\Delta_{H^l} Q^{(R)}(\lambda|\overline{\lambda}) = \quad (16)$$
$$-\sum_{r=1}^{R}\sum_{k=1}^{K_r}\sum_{q=1}^{S}\sum_{p=1}^{M}\gamma^r_{qp}(k)[g(\mu^l_{qp}, H^l, N^l) -$$
$$C^{-1}Y_r(k)]\Delta_{H^l}g(\mu^l_{qp}, H^l, N^l),$$

$$\Delta^2_{H^l} Q^{(R)}(\lambda|\overline{\lambda}) = \quad (17)$$
$$-\sum_{r=1}^{R}\sum_{k=1}^{K_r}\sum_{q=1}^{S}\sum_{p=1}^{M}\gamma^r_{qp}(k)\Big[(\Delta_{H^l}g(\mu^l_{qp}, H^l, N^l))^2 + (g(\mu^l_{qp}, H^l, N^l) -$$
$$C^{-1}Y_r(k))\Delta^2_{H^l}g(\mu^l_{qp}, H^l, N^l)\Big].$$

A further simplification arrives at the technique presented in Gong, "Model-Space Compensation of Microphone and Noise for Speaker-Independent Speech Recognition," in ICASSP, 2003, pp. 660-663, which sets forth the following Equations (18) and (19):

$$\Delta_{H^l} Q^{(R)}(\lambda|\overline{\lambda}) = -\sum_{r=1}^{R}\sum_{k=1}^{K_r}\sum_{q=1}^{S}\sum_{p=1}^{M}\gamma^r_{qp}(k)[g(\mu^l_{qp}, H^l, N^l) - C^{-1}Y_r(k)], \quad (18)$$

$$\Delta^2_{H^l} Q^{(R)}(\lambda|\overline{\lambda}) = -\sum_{r=1}^{R}\sum_{k=1}^{K_r}\sum_{q=1}^{S}\sum_{p=1}^{M}\gamma^r_{qp}(k)\Delta_{H^l}g(\mu^l_{qp}, H^l, N^l). \quad (19)$$

Equations (18) and (19) result from Equations (16) and (17) when $\Delta_{H^l}g(\mu_{qp}{}^l,H^l,N^l)$ is removed and the following assumption is made:

$$1 - \Delta_{H^l}g(\mu^l_{qp},H^l,N^l) << \Delta_{h^l}g(\mu^l_{qp},H^l,N^l). \quad (20)$$

By Equation (13), Equation (20) is equivalent to $\exp(N^l) << \exp(H^l+\mu_{qp}{}^l)$. Equations (18) and (19) are therefore based on the assumption that additive noise power is much smaller than convoluted speech power. As a result, Equations (18) and (19) may not perform as well as Equations (16) and (17) when noise levels are closer in magnitude to convoluted speech power. Experiments set forth below will verify this statement.

One embodiment of the present invention introduces a forgetting factor ρ, lying in the range of zero to one, that is used to force parameter updating with more emphasis on recent utterances. With ρ, Equations (16) and (17) can be updated as an utterance-by-utterance way, i.e.:

$$\Delta_{H^l} Q^{(R)}(\lambda|\bar{\lambda}) = -\sum_{r=1}^{R} \rho^{R-r} \sum_{k=1}^{K_r} \sum_{q=1}^{S} \sum_{p=1}^{M} \gamma_{qp}^r(k)[g(\mu_{qp}^l, H^l, N^l) - C^{-1} Y_r(k)] \Delta_{H^l} g(\mu_{qp}^l, H^l, N^l) \quad (21)$$

$$= \rho \times \Delta_{H^l} Q^{(R-1)}(\lambda|\bar{\lambda}) - \sum_{q=1}^{S} \sum_{p=1}^{M} \gamma_{qp}^r(k)[g(\mu_{qp}^l, H^l, N^l) - C^{-1} Y_r(k)] \Delta_{H^l} g(\mu_{qp}^l, H^l, N^l)$$

$$\Delta_{H^l}^2 Q^{(R)}(\lambda|\bar{\lambda}) = -\sum_{r=1}^{R} \rho^{R-r} \sum_{k=1}^{K_r} \sum_{q=1}^{S} \sum_{p=1}^{M} \gamma_{qp}^r(k) \quad (22)$$

$$[(\Delta_{H^l} g(\mu_{qp}^l, H^l, N^l))^2 + (g(\mu_{qp}^l, H^l, N^l) - C^{-1} Y_r(k)) \Delta_{H^l}^2 g(\mu_{qp}^l, H^l, N^l)]$$

$$= \rho \times \Delta_{H^l}^2 Q^{(R-1)}(\lambda|\bar{\lambda}) - \sum_{k=1}^{K_R} \sum_{q=1}^{S} \sum_{p=1}^{M} \gamma_{qp}^R(k)[(\Delta_{H^l} g(\mu_{qp}^l, H^l, N^l))^2 + (g(\mu_{qp}^l, H^l, N^l) - C^{-1} Y_r(k)) \Delta_{H^l}^2 g(\mu_{qp}^l, H^l, N^l)].$$

The simplifications described above may introduce some modeling error under some conditions. As a result, updating Equation (10) may result in a biased convolutive distortion factor estimate. To counteract this, one embodiment of the present invention introduces a discounting factor ξ, also lying in the range of zero to one. The discounting factor is multiplied with the previous estimate. The new updating equation is given as:

$$H^l = \xi \bar{H}^l - \frac{\Delta_{H^l} Q^{(R)}(\lambda|\bar{\lambda})}{\Delta_{H^l}^2 Q^{(R)}(\lambda|\bar{\lambda})}\bigg|_{H^l = \xi \bar{H}^l}, \quad (23)$$

Importantly, calculation of the sufficient statistics does not incur such discounting factor. Therefore, introduction of the discounting factor ξ causes a mismatch between $H^l$ used for the sufficient statistics and $H^l$ for calculating derivatives in $g(\mu_{qp}^l, H^l, N^l)$. Fortunately, by adjusting ξ modeling error may be alleviated. The effects of ξ on recognition performance will be described below.

The additive distortion factor $N^l$ may be updated via Equation (15). Using the well-known chain rule of differentiation, $\Delta_{N^l} Q^{(R)}(\lambda|\bar{\lambda})$, the first-order differentiation of Equation (6) is obtained with respect to $N^l$ as:

$$\Delta_{N^l} Q^{(R)}(\lambda|\bar{\lambda}) = \quad (24)$$

$$-\sum_{r=1}^{R} \sum_{k=1}^{K_r} \sum_{q=1}^{S} \sum_{p=1}^{M} \gamma_{qp}^r(k)[g(\mu_{qp}^l, H^l, N^l) - C^{-1} Y_r(k)] \Delta_{N^l} g(\mu_{qp}^l, H^l, N^l),$$

where the first-order differential term $\Delta_{N^l} g(\mu_{qp}^l, H^l, N^l)$ is given in Equation (26).

The second order differentiation of Equation (6) with respect to $N^l$ is given as:

$$\Delta_{N^l}^2 Q^{(R)}(\lambda|\bar{\lambda}) = -\sum_{r=1}^{R} \sum_{k=1}^{K_r} \sum_{q=1}^{S} \sum_{p=1}^{M} \gamma_{qp}^r(k)[(\Delta_{N^l} g(\mu_{qp}^l, H^l, N^l))^2 + (g(\mu_{qp}^l, H^l, N^l) - C^{-1} Y_r(k)) \Delta_{N^l}^2 g(\mu_{qp}^l, H^l, N^l)], \quad (25)$$

where Equation (27) gives the second-order term $\Delta_{N^l}^2 g(\mu_{qp}^l, H^l, N^l)$.

A straightforward algebraic manipulation of Equation (5) yields the first- and second-order differential of $g(\mu_{qp}^l, H^l, N^l)$, shown below as:

$$\Delta_{N^l} g(\mu_{qp}^l, H^l, N^l) = \frac{\exp(N^l)}{\exp(H^l + \mu_{qp}^l) + \exp(N^l)}, \quad (26)$$

$$\Delta_{N^l}^2 g(\mu_{qp}^l, H^l, N^l) = \Delta_{N^l} g(\mu_{qp}^l, H^l, N^l)(1 - \Delta_{N^l} g(\mu_{qp}^l, H^l, N^l)). \quad (27)$$

Having set forth the theoretical underpinnings of an exemplary technique falling within the scope of the present invention, an exemplary system and method for noisy ASR employing joint compensation of additive and convolutive distortions can now be described.

Figure 1:
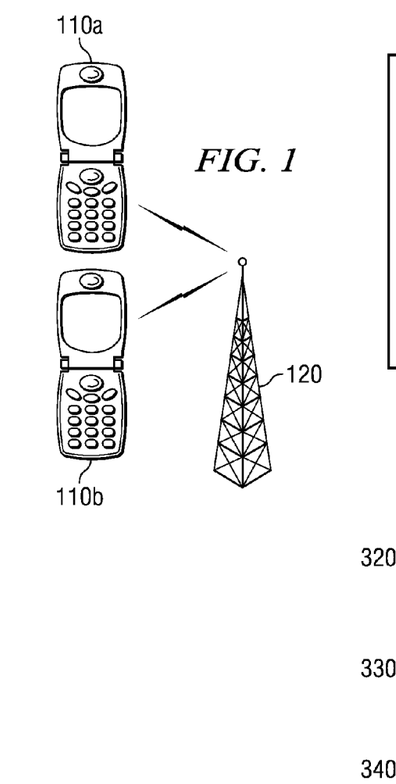
FIG. 1 illustrates a high level schematic diagram of a wireless telecommunication infrastructure containing a plurality of mobile telecommunication devices within which the system and method of the present invention can operate.

Accordingly, referring to FIG. 1, illustrated is a high level schematic diagram of a wireless telecommunication infrastructure, represented by a cellular tower 120, containing a plurality of mobile telecommunication devices 110a, 110b within which the system and method of the present invention can operate.

One advantageous application for the system or method of the present invention is in conjunction with the mobile telecommunication devices 110a, 110b. Although not shown in FIG. 1, today's mobile telecommunication devices 110a, 110b contain limited computing resources, typically a DSP, some volatile and nonvolatile memory, a display for displaying data and a keypad for entering data.

Certain embodiments of the present invention described herein are particularly suitable for operation in the DSP. The DSP may be a commercially available DSP from Texas Instruments of Dallas, Tex. An embodiment of the system in such a context will now be described.

Figure 2:
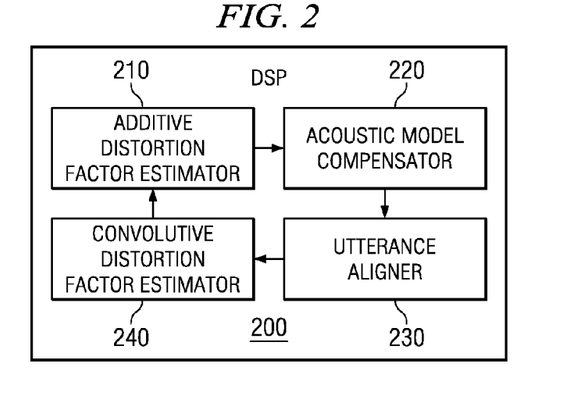
FIG. 2 illustrates a high-level block diagram of a DSP located within at least one of the mobile telecommunication devices of FIG. 1 and containing one embodiment of a system for noisy ASR employing joint compensation of additive and convolutive distortions constructed according to the principles of the present invention.

Turning now to FIG. 2, illustrated is a high-level block diagram of a DSP located within at least one of the mobile telecommunication devices of FIG. 1 and containing one embodiment of a system for noisy ASR employing joint compensation of additive and convolutive distortions constructed according to the principles of the present invention. Those skilled in the pertinent art will understand that a conventional DSP contains data processing and storage circuitry that is controlled by a sequence of executable software or firmware instructions. Most current DSPs are not as computationally powerful as microprocessors. Thus, the computational efficiency of techniques required to be carried out in DSPs in real-time is a substantial issue.

The system contains an additive distortion factor estimator 210. The additive distortion factor estimator 210 is configured to estimate an additive distortion factor, preferably from non-speech segments of a current utterance. The initial ten frames of input features may advantageously be averaged. The average may then be used as the additive distortion factor estimate $N^l$.

Coupled to the additive distortion factor estimator 210 is an acoustic model compensator 220. The acoustic model compensator 220 is configured to use the estimates of distortion factors $H^l$ and $N^l$ to compensate acoustic models $\Lambda_X$ and recognize the current utterance R. (The convolutive distortion factor $H^l$ is initially set at zero and thereafter carried forward from the previous utterance.)

Coupled to the acoustic model compensator 220 is an utterance aligner 230. The utterance aligner 230 is configured to align the current utterance R using recognition output. sufficient statistics $\gamma_{qp}^R(k)$ are preferably obtained for each state q, mixture component p and frame k.

Coupled to the utterance aligner 230 is a convolutive distortion factor estimator 240. The convolutive distortion estimator 240 is configured to estimate the convolutive distortion factor $H^l$ based on the current utterance using differential terms but disregarding log-spectral domain variance terms. In certain embodiments described herein, the convolutive distortion estimator 240 is configured to estimate the convolutive distortion factor $H^l$ based on the current utterance using first-order and second-order differential terms. The present invention encompasses embodiments that make use of differential terms other than, or in addition to, the first-order or second-order terms. To estimate the convolutive distortion factor $H^l$, the illustrated embodiment of the convolutive distortion factor estimator 240 accumulates sufficient statistics via Equations (21) and (22) and updates the convolutive distortion estimate for the next utterance by Equation (23).

Analysis of the next utterance R then begins, which invokes the additive distortion factor estimator 210 to start the process anew.

Figure 3:
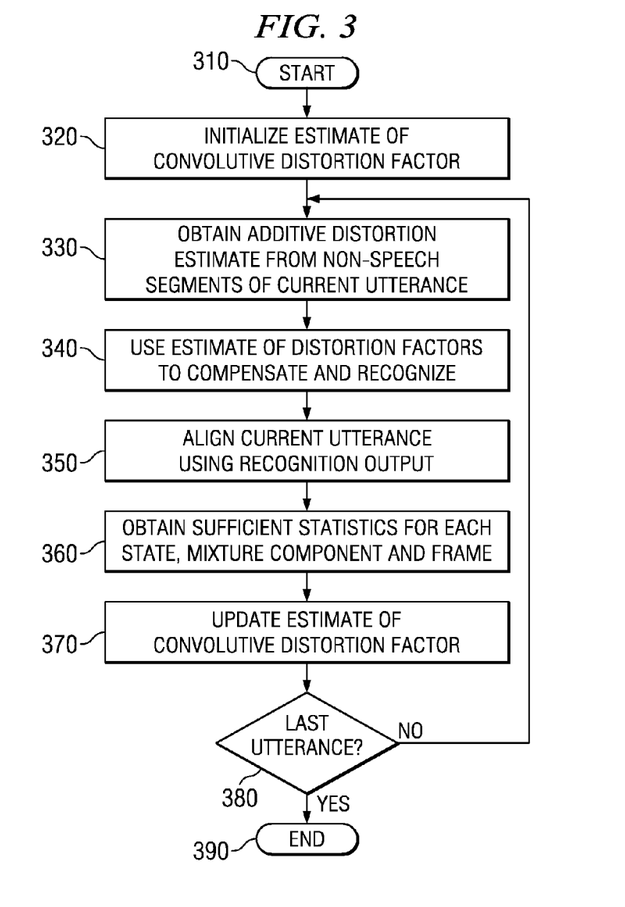
FIG. 3 illustrates a flow diagram of one embodiment of a method of noisy ASR employing joint compensation of additive and convolutive distortions carried out according to the principles of the present invention.

Turning now to FIG. 3, illustrated is a flow diagram of one embodiment of a method of noisy ASR employing joint compensation of additive and convolutive distortions carried out according to the principles of the present invention. Since convolutive distortion can be considered as slowly varying, in contrast to additive distortion, the method treats the two separately.

The method begins in a start step 310 wherein it is desired to recognize potentially noisy speech. In a step 320, an estimate of the convolutive distortion factor $H^l$ is initialized, e.g., to zero. In a step 330, an estimate of an additive distortion factor $N^l$ is obtained from non-speech segments of the current utterance. As stated above, the initial (e.g., ten) frames of input features may be averaged to extract the mean of the frames. The mean may be used as the additive distortion factor estimate. In a step 340, the estimates of the distortion factors $H^l$, $N^l$ are used to compensate the acoustic models $\Lambda_X$ and recognize the current utterance R.

In a step 350, the current utterance R is aligned using recognition output. In a step 360, sufficient statistics $\gamma_{qp}^R(k)$ are obtained for each state q, mixture component p and frame k. In a step 370, sufficient statistics are accumulated via Equations (21) and (22), and the convolutive distortion factor estimate is updated for the next utterance by Equation (23).

In a decisional step 380, it is determined whether the current utterance is the last utterance. If not, R←R+1, and the method repeats beginning at the step 330. If so, the method ends in an end step 390.

One embodiment of the novel technique of the present invention will hereinafter be called "IJAC." To assess the performance of the new technique, it will now be compared to a prior art joint additive/convolutive compensation technique introduced in Gong, supra, which will hereinafter be called "JAC."

IJAC and JAC will be performed with respect to exemplary "hands-free" databases of spoken digits and names. The digit database was recorded in a car, using an AKG M2 hands-free distant talking microphone, in three recording sessions: parked (engine off), city driving (car driven on a stop-and-go basis), and highway driving (car driven at relatively steady highway speeds). In each session, 20 speakers (ten male, ten female) read 40 sentences each, resulting in 800 utterances. Each sentence is either a 10, 7 or 4 digit sequence, with equal probabilities. The digits database is sampled at 8 kHz, with a frame rate of 20 ms. 10-dimensional MFCC features were derived from the speech.

The CD-HMMs are trained on clean speech data recorded in a laboratory. The HMMs contain 1957 mean vectors and 270 diagonal variances. Evaluated on a test set, the recognizer gives a 0.36% word error rate.

Given the above HMM models, the hands-free database presents a severe mismatch. First, the microphone is distant talking band-limited, as compared to a high-quality microphone used to collect clean speech data. Second, a substantial amount of background noise is present due to the car environment, with the signal-to-noise ratio (SNR) decreasing to 0 dB in the highway condition.

The variances of the CD-HMMs are adapted by MAP with some slightly noisy data in parked condition. Such adaptation does not affect recognition of clean speech, but reduces variance mismatch between HMMs and the noisy speech.

Ideally, the convolutive distortion corresponding to the microphone should be independent of the testing utterance. However, due to varying noise distortion and utterance length, the estimated convolutive distortion may vary from utterance to utterance. Moreover, since IJAC and JAC employ different updating mechanisms, different estimates may result.

Figure 4:
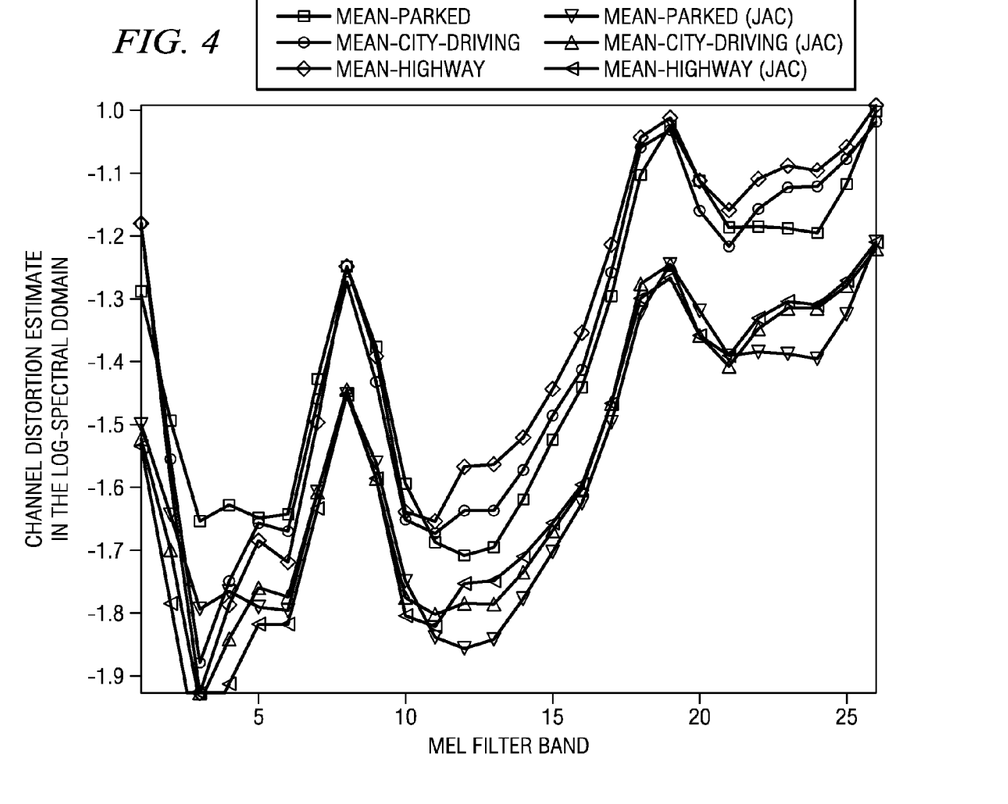
FIG. 4 illustrates a plot of convolutive distortion estimates by an illustrated embodiment of the present invention and a prior art joint additive/convolutive compensation technique, averaged over all testing utterances for three exemplary driving conditions: parked, city-driving and highway.
Figure 5:
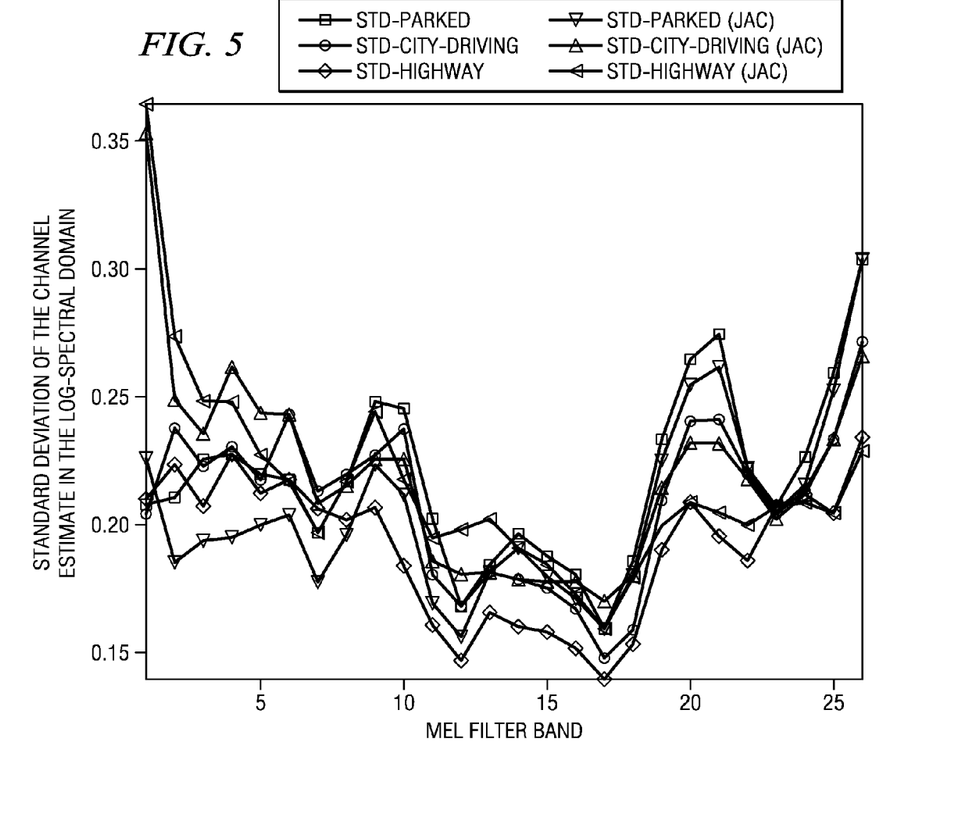
FIG. 5 illustrates a plot of the standard deviation of channel estimates by an illustrated embodiment of the present invention and a prior art joint additive/convolutive compensation technique, averaged over all testing utterances for the three exemplary driving conditions of FIG. 4.

Turning now to FIGS. 4 and 5, illustrated are, in FIG. 4, a plot of convolutive distortion estimates by IJAC and JAC, averaged over all testing utterances for three exemplary driving conditions: parked, city driving and highway driving and, in FIG. 5, a plot of the standard deviation of channel estimates by IJAC and JAC, averaged over all testing utterances for the three exemplary driving conditions of FIG. 4.

The following should be apparent. First, for each technique, the estimates in different driving conditions are generally in agreement. This observation shows that the estimation techniques are not much dependent on the noise level. Second, FIG. 4 shows a bias between estimates by IJAC and JAC. JAC appears to under-estimate convolutive distortion. Third, FIG. 5 clearly shows that, in lower-frequency bands, IJAC has a smaller estimation variance than JAC. Note that, in these frequency bands, estimation variance in higher noise levels by JAC is larger than its estimate in the parked condition. In contrast, IJAC does not experience higher estimation variance due to higher noise level.

According to the above observations and analysis, IJAC produces a smaller estimation error than JAC. Speech recognition experiments will now be set forth that verify the superiority of IJAC.

IJAC is again compared with JAC. Speech enhancement by spectral subtraction (SS) (see, e.g., Boll, supra) may be combined with these two techniques. Recognition results are summarized in Table 1, below. In Table 1, IJAC is configured with $\xi=0.3$ and $\rho=0.6$.

TABLE 1

WER of Digit Recognition

| WER (%) | Parked | City Driving | Highway Driving |
|---|---|---|---|
| Baseline | 1.38 | 30.3 | 73.2 |
| JAC | 0.32 | 0.61 | 2.48 |
| JAC + SS | 0.34 | 0.56 | 1.99 |
| IJAC | 0.32 | 0.52 | 2.43 |
| IJAC + SS | 0.31 | 0.54 | 1.83 |

Table 1 reveals several things. First, performance of the baseline (without noise robustness techniques) degrades severely. Second, JAC substantially reduces the word error rate (WER) under all driving conditions. Third, SS benefits both JAC and IJAC in the highway condition. Fourth, IJAC performs consistently better than JAC.

TABLE 2

Relative WER Reduction (ERR) of Digit recognition

| ERR (%) | Parked | City Driving | Highway Driving |
|---|---|---|---|
| IJAC vs. baseline | 76.8 | 98.3 | 96.7 |
| IJAC + SS vs. baseline | 77.5 | 98.2 | 97.5 |
| IJAC vs. JAC | 0.0 | 14.8 | 2.0 |
| IJAC + SS vs. JAC + SS | 8.8 | 3.5 | 8.0 |

Table 2 further elaborates on the comparison results by showing relative word error rate reduction (ERR), of IJAC as compared to baseline and JAC. It should be observed that IJAC significantly reduces word error rate as compared to the baseline, and it also performs consistently better than JAC.

The reported results were obtained for IJAC implemented in floating point. Parameters, such as $\xi$ and $\rho$, in IJAC may need careful adjustment when the IJAC is implemented in fixed-point C. For example, IJAC's best performance may be realized in fixed-point C with $\xi=0.3$ and $\rho=0.6$. Whereas baseline JAC has 0.27%, 0.59%, and 2.28% WER, respectively, in parked, city driving, and highway conditions, IJAC attains 0.23%, 0.52%, and 2.23% WER in the three driving conditions. This results in a 9% relative WER reduction.

The name database was collected using the same procedure as the digit database. The database contains 1325 English name utterances collected in cars. Therefore, the utterances in the database were noisy. Another difficulty was due to multiple pronunciation of names. It is therefore interesting to see the performance of different compensation techniques on this database.

The baseline acoustic model CD-HMM was a generalized tied-mixture HMM (GTM-HMM) (see, Yao, supra, and incorporated herein by reference). In tied-mixture HMMs, the HMM states of a phone's model are allowed to share Gaussian mixture components with the HMM states of alternate pronunciation models. The GTM-HMM aims at enhanced representation of observation probabilities modeled by each state of triphone models. Whereas a triphone model after a decision-tree-based state tying has one Gaussian density at each state, the GTM-HMM shares its Gaussian density with other states, thus effectively increases the resolution of the probability density modeled at each state. The model was trained in two stages. The first stage trained the acoustic model from the Wall Street Journal (WSJ) with a manual dictionary. Decision-tree-based state tying was applied to train the gender-dependent acoustic model. As a result, the model had one Gaussian component per state and 9573 mean vectors. In the second stage, a mixture-tying mechanism was applied to tie mixture components from a pool of Gaussian densities. After the mixture tying, the acoustic model was retrained using the WSJ database.

The recognition results are summarized in Table 3. IJAC is again compared with JAC. Features were 10-dimensional MFCC and its delta coefficients.

TABLE 3

WER of Name Recognition

| WER (%) | Parked | City Driving | Highway Driving |
|---|---|---|---|
| Baseline | 2.2 | 50.2 | 82.9 |
| JAC | 0.28 | 1.04 | 4.99 |
| IJAC | 0.24 | 0.96 | 3.52 |

In Table 3, IJAC is configured with $\xi=0.7$ and $\rho=0.6$. Table 3 shows several things. First, performance of the baseline (without noise robustness techniques) degrades severely as noise increases. Second, JAC substantially reduces the WER for all driving conditions. Third, IJAC's performance is significantly better than JAC under all driving conditions.

Table 4 shows relative word error rate reduction of IJAC as compared to baseline and JAC.

TABLE 4

Relative ERR of Name Recognition Achieved by IJAC as Compared to the Baseline and JAC

| ERR (%) | Parked | City Driving | Highway Driving |
|---|---|---|---|
| IJAC vs. baseline | 89.1 | 98.1 | 95.8 |
| IJAC vs. JAC | 14.3 | 7.7 | 29.5 |

Table 4 shows relative word error rate reduction of IJAC as compared to baseline and JAC. It is observed that IJAC performs consistently better than JAC under all driving conditions. More importantly, in the highway condition, IJAC significantly reduced ERR by 29.5%, as compared to JAC. Together with the experiments set forth herein, the results confirmed Equation (20), which holds that IJAC in principle has better performance in high noise level than JAC.

Notice that a segmental updating technique by Equations (21) and (22) may be used to implement IJAC. It is thus interesting to study effects of the forgetting factor $\rho$ on system performance.

Figure 6:
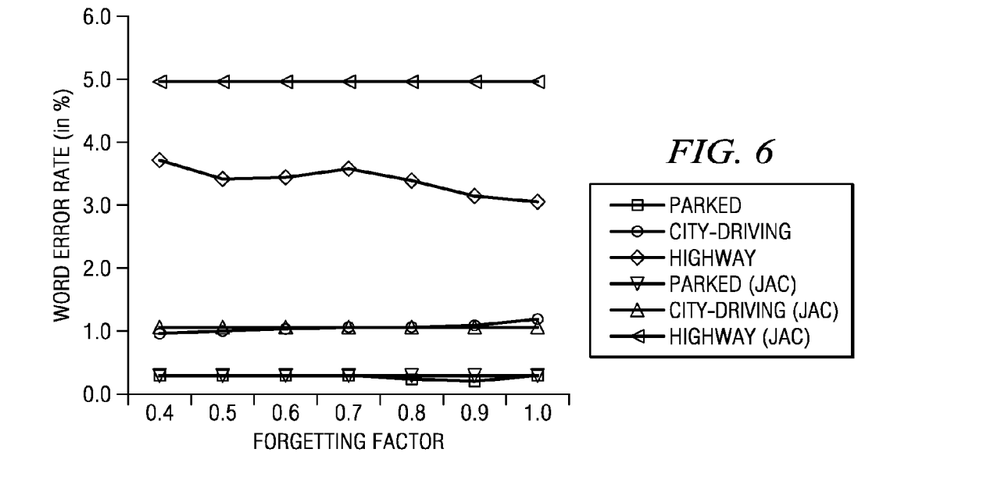
FIG. 6 illustrates a plot of word error rate by an illustrated embodiment of the present invention as a function of a forgetting factor.

Accordingly, turning now to FIG. 6, illustrated a plot of word error rate by IJAC as a function of a forgetting factor. FIG. 6 plots word error rate achieved by IJAC ($\xi=0.8$) as a function of the forgetting factor $\rho$, together with JAC, in different driving conditions.

Several things are evident. First, performance by IJAC in the highway condition is significantly better than JAC. WER reduction by $\rho=0.4$ attained 25.3%. The highest WER reduction was achieved by setting $\rho=1.0$, corresponding to 38.5%. Second, IJAC does not perform much differently due to varying forgetting factor $\rho$, in all three driving conditions. Third, because of slowly varying convolutive distortion, the forgetting factor for segmental updating does not incur much effects on the performance.

Distortion factors are updated by Equation (23) which uses a discounting factor $\xi$ to modify the previous estimates. As suggested above, IJAC may accommodate modeling error.

Figure 7:
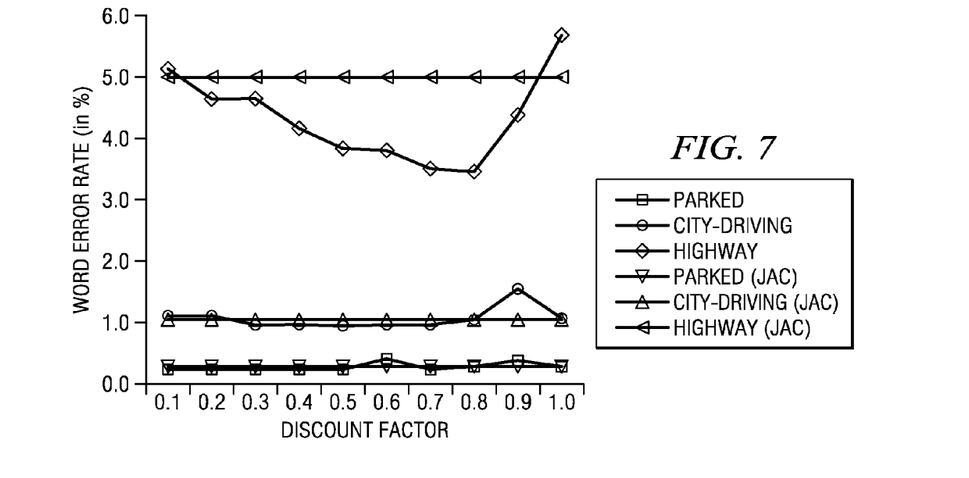
FIG. 7 illustrates a plot of word error rate by an illustrated embodiment of the present invention as a function of a discounting factor.

Accordingly, turning now to FIG. 7, illustrated is a plot of word error rate by IJAC as a function of a discounting factor. FIG. 7 plots word error rate of IJAC ($\rho=0.6$) as a function of $\xi$, together with performances by JAC. The right-most points show performance of updating convolutive distortion without discounting factor, corresponding to $\xi=1.0$.

The following observations may be made. First, performance in parked condition was similar to that achieved by JAC. Moreover, performance did not vary much with changes of $\xi$. Second, significant performance difference arise between IJAC and JAC in the highway condition. The highest WER reduction is achieved at $\xi=0.8$, corresponding to 30.6%. Furthermore, because the highway condition has a particularly low SNR, IJAC achieves better performance than JAC in a wide range of $0.2 \leq \xi \leq 0.9$. Third, a certain range of $\xi$ makes IJAC perform better than JAC under all driving conditions. In this example, the range is $0.3 \leq \xi \leq 0.8$.

The first and second observations suggest that IJAC is indeed able to perform better than JAC due to its more strict formulae in Equations (16) and (17) for accumulating sufficient statistics. The above results also confirm the effectiveness of a discounting factor in dealing with possible modeling error.

Figure 8:
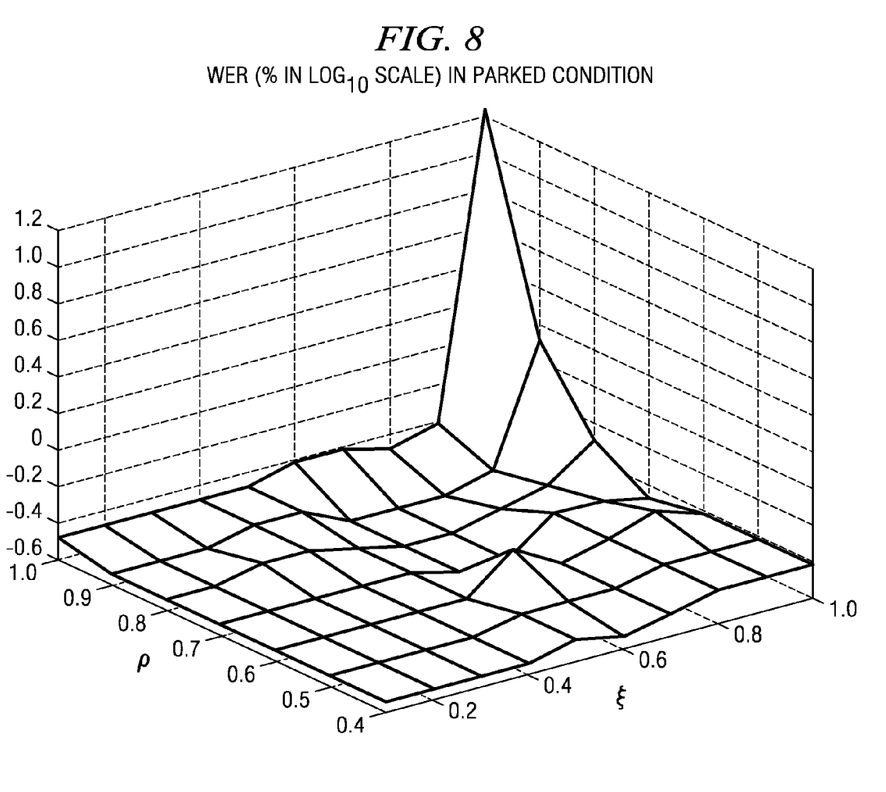
FIG. 8 illustrates a plot of performance by an illustrated embodiment of the present invention as a function of discounting factor and forgetting factor in a parked condition.
Figure 9:
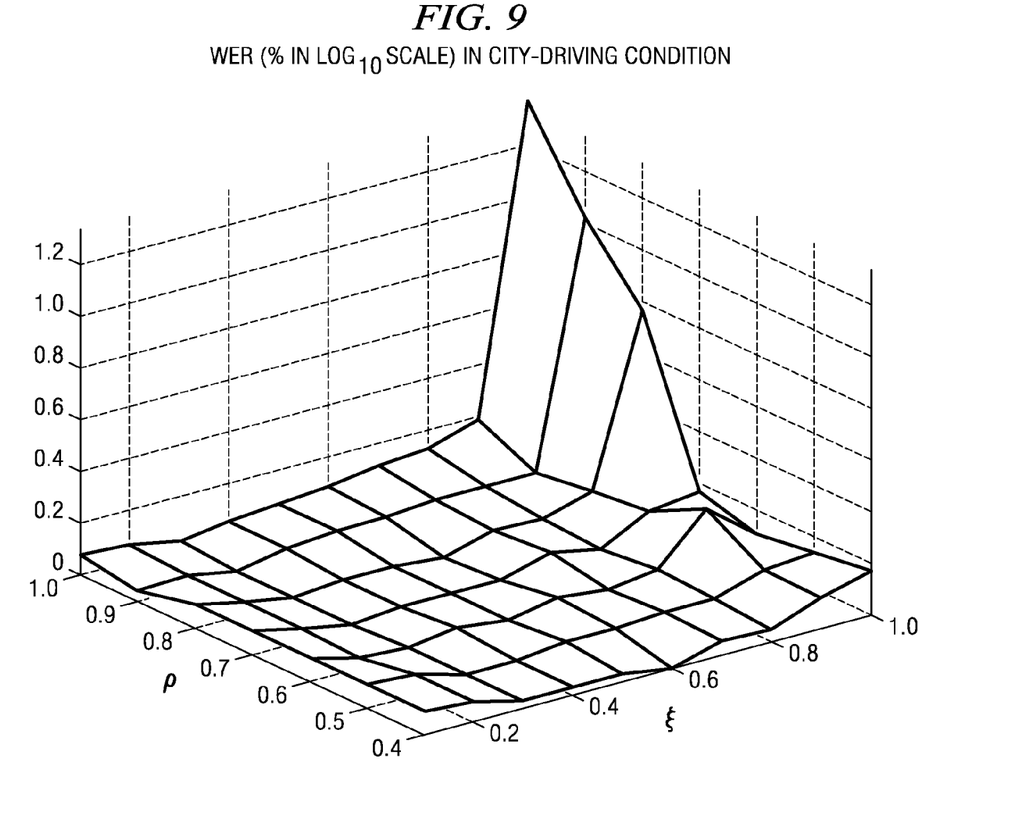
FIG. 9 illustrates a plot of performance by an illustrated embodiment of the present invention as a function of discounting factor and forgetting factor in a city-driving condition.
Figure 10:
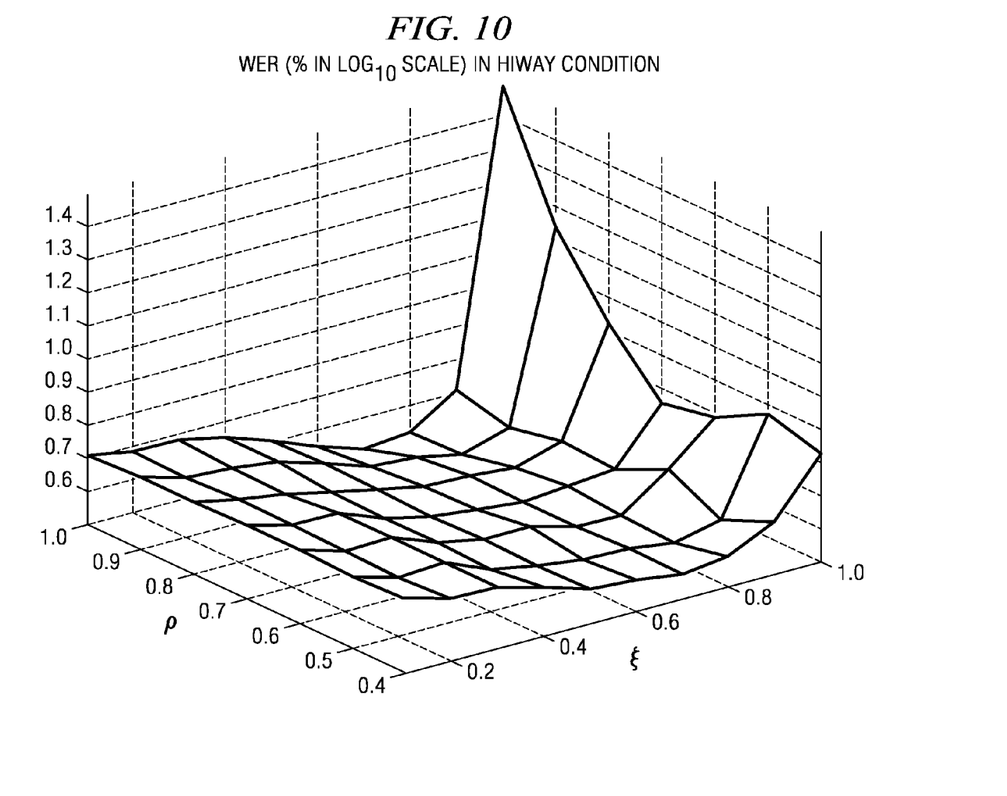
FIG. 10 illustrates a plot of performance by an illustrated embodiment of the present invention as a function of discounting factor and forgetting factor in a highway condition.

Now, the performance of IJAC as a function of discounting factor $\xi$ and forgetting factor $\rho$ will be described. Accordingly, turning now to FIGS. 8, 9 and 10, illustrated are a plot of performance by IJAC as a function of discounting factor and forgetting factor in a parked condition (FIG. 8), a plot of performance by IJAC as a function of discounting factor and forgetting factor in a city-driving condition (FIG. 9) and a plot of performance by IJAC as a function of discounting factor and forgetting factor in a highway condition (FIG. 10). Each are plotted in FIGS. 8, 9 and 10 as WER (%) as a function of $\xi$ and $\rho$ for parked, city-driving, and highway conditions. The WER is scaled to $\log_{10}$ to show detailed performance differences due to different $\xi$ and $\rho$. The following observations result.

First, the worst performance in all three conditions is at $\xi=1.0$, $\rho=1.0$, corresponding to the following assumptions: (1) distortions are stationary ($\rho=1.0$) and (2) no modeling error results from simplifications. Those skilled in the pertinent art should understand that these two assumptions are rarely correct.

Second, ranges of $\xi$ and $\rho$ exist where IJAC is able to achieve the lowest WER. However, the best ranges are dependent on driving conditions. For example, the best range may be $0.4 \leq \xi \leq 0.8$ and $0.4 \leq \rho \leq 1.0$ for the highway condition, whereas the best range may be $\xi \leq 0.6$ and $\rho \leq 0.8$ for the city-driving condition. Performance in the parked condition appears to be independent from $\xi$ and $\rho$, except the extreme of $\xi=1.0$, $\rho=1.0$ mentioned above. Nevertheless, IJAC is able to achieve low WER within a wide range of $\xi$ and $\rho$.

Although the present invention has been described in detail, those skilled in the art should understand that they can make various changes, substitutions and alterations herein without departing from the spirit and scope of the invention in its broadest form.

What is claimed is:

1. An apparatus for noisy automatic speech recognition employing joint compensation of additive and convolutive distortions, comprising:
   an additive distortion factor estimator configured to estimate an additive distortion factor;
   an acoustic model compensator coupled to said additive distortion factor estimator and configured to use estimates of a convolutive distortion factor and said additive distortion factor to compensate acoustic models and recognize a current utterance;
   an utterance aligner coupled to said acoustic model compensator and configured to align said current utterance using recognition output; and
   a convolutive distortion factor estimator coupled to said utterance aligner and configured to estimate an updated convolutive distortion factor based on said current utterance using differential terms but disregarding log-spectral domain variance terms.

2. The apparatus as recited in claim 1 wherein said convolutive distortion factor estimator is further configured to estimate said updated convolutive distortion factor based on a discounting factor.

3. The apparatus as recited in claim 1 wherein said convolutive distortion factor estimator is further configured to estimate said updated convolutive distortion factor based on a forgetting factor.

4. The apparatus as recited in claim 1 wherein said convolutive distortion factor estimator is further configured to obtain sufficient statistics for each state, mixture component and frame of said current utterance.

5. The apparatus as recited in claim 1 wherein said additive distortion factor estimator is configured to estimate said additive distortion factor from non-speech segments of said current utterance.

6. The apparatus as recited in claim 1 wherein said additive distortion factor estimator is configured to estimate said additive distortion factor by averaging initial frames of input features.

7. The apparatus as recited in claim 1 wherein said system is embodied in a digital signal processor of a mobile telecommunication device.

8. A method of noisy automatic speech recognition, for a digital signal processor, employing joint compensation of additive and convolutive distortions, comprising:
   estimating an additive distortion factor;
   using estimates of a convolutive distortion factor and said additive distortion factor to compensate acoustic models and recognize a current utterance;
   aligning said current utterance using recognition output; and
   estimating an updated convolutive distortion factor based on said current utterance using first-order differential terms but disregarding log-spectral domain variance terms.

9. The method as recited in claim 8 wherein said estimating said updated convolutive distortion factor comprises estimating said updated convolutive distortion factor based on a discounting factor.

10. The method as recited in claim 8 said estimating said updated convolutive distortion factor comprises estimating said updated convolutive distortion factor based on a forgetting factor.

11. The method as recited in claim 8 wherein said estimating said updated convolutive distortion factor comprises obtaining sufficient statistics for each state, mixture component and frame of said current utterance.

12. The method as recited in claim 8 wherein said estimating said additive distortion factor comprises estimating said additive distortion factor from non-speech segments of said current utterance.

13. The method as recited in claim 8 wherein said estimating said additive distortion factor comprises estimating said additive distortion factor by averaging initial frames of input features.

14. The method as recited in claim 8 wherein said method is carried out in a digital signal processor of a mobile telecommunication device.

15. A digital signal processor (DSP), comprising:
data processing and storage circuitry controlled by a sequence of executable instructions configured to:
estimate an additive distortion factor;
use estimates of a convolutive distortion factor and said additive distortion factor to compensate acoustic models and recognize a current utterance;
align said current utterance using recognition output; and
estimate an updated convolutive distortion factor based on said current utterance using differential terms but disregarding log-spectral domain variance terms.

16. The DSP as recited in claim 15 wherein said instructions estimate said updated convolutive distortion factor based on a discounting factor.

17. The DSP as recited in claim 15 wherein said instructions estimate estimating said updated convolutive distortion factor based on a forgetting factor.

18. The DSP as recited in claim 15 wherein said instructions obtain sufficient statistics for each state, mixture component and frame of said current utterance.

19. The DSP as recited in claim 15 wherein said instructions estimate said additive distortion factor from non-speech segments of said current utterance.

20. The DSP as recited in claim 15 wherein said instructions estimate said additive distortion factor by averaging initial frames of input features.

* * * * *

UNITED STATES PATENT AND TRADEMARK OFFICE
CERTIFICATE OF CORRECTION

PATENT NO. : 7,584,097 B2  Page 1 of 1
APPLICATION NO. : 11/298332
DATED : September 1, 2009
INVENTOR(S) : Kaisheng N. Yao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 892 days.

Signed and Sealed this

Fourteenth Day of September, 2010

David J. Kappos
*Director of the United States Patent and Trademark Office*